US008186817B2

(12) United States Patent
Jones et al.

(10) Patent No.: US 8,186,817 B2
(45) Date of Patent: May 29, 2012

(54) SYSTEM AND METHOD FOR TRANSPORTING FLUID THROUGH A CONDUIT

(75) Inventors: Brent R. Jones, Sherwood, OR (US); Brian Walter Aznoe, Sherwood, OR (US); Charles Russell Firkins, Newberg, OR (US); Darrell Ray Finneman, Albany, OR (US); James Michael Bonicatto, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 779 days.

(21) Appl. No.: 11/511,697

(22) Filed: Aug. 29, 2006

(65) Prior Publication Data

US 2008/0055377 A1 Mar. 6, 2008

(51) Int. Cl.
*B41J 2/175* (2006.01)
*B41J 2/05* (2006.01)
*G01D 11/00* (2006.01)

(52) U.S. Cl. ................................ 347/88; 347/99; 347/65

(58) Field of Classification Search .................... 347/88, 347/99, 103, 65
See application file for complete search history.

(56) References Cited

U.S. PATENT DOCUMENTS 3,516,455 A 6/1970 Carter
4,234,885 A * 11/1980 Arway ............................ 347/85
4,403,229 A 9/1983 Barteck
4,607,261 A 8/1986 McCann et al.
5,098,221 A 3/1992 Osborne
5,159,348 A 10/1992 Dietl et al.
5,436,651 A * 7/1995 Torii et al. ....................... 347/88
5,557,305 A 9/1996 Hine et al.
5,724,082 A * 3/1998 Moynihan ........................ 347/88
5,734,402 A 3/1998 Rousseau et al.
5,861,903 A 1/1999 Crawford et al.
5,910,810 A 6/1999 Brooks et al.
6,003,971 A 12/1999 Hanks et al.
6,139,136 A * 10/2000 Mackay et al. ................. 347/85
6,142,707 A 11/2000 Bass et al.
6,290,343 B1 9/2001 Lewis et al.

(Continued)

FOREIGN PATENT DOCUMENTS

EP 0178880 A1 4/1986

(Continued)

OTHER PUBLICATIONS

EP Novelty Search Report, European Patent Office, Munich, Germany, Dec. 29, 2008.

(Continued)

*Primary Examiner* — Stephen Meier
*Assistant Examiner* — Sarah Al Hashimi
(74) *Attorney, Agent, or Firm* — Maginot, Moore & Beck, LLP

(57) ABSTRACT

A fluid transport apparatus facilitates flow of fluid from a source to a receptacle. The fluid transport apparatus includes a fluid transport conduit for transport of fluid through the conduit, the conduit being coupled between a fluid supply and a fluid receptacle, a compressor conduit proximate the fluid transport conduit along a portion of the fluid transport conduit between the fluid supply and the fluid receptacle, and a pump coupled to the compressor conduit for injecting fluid into the compressor conduit, and a vent that is operated to selectively enable pressurization and venting of the compressor conduit to compress and decompress the portion of the fluid transport conduit proximate the compressor conduit to pump fluid through the fluid transport conduit.

15 Claims, 7 Drawing Sheets

U.S. PATENT DOCUMENTS

| | | | | |
|---|---|---|---|---|
| 6,383,329 | B1 * | 5/2002 | Agarwala et al. | 156/344 |
| 6,481,837 | B1 | 11/2002 | Askren et al. | |
| 6,824,241 | B2 * | 11/2004 | Sonnichsen et al. | 347/20 |
| 6,860,591 | B2 * | 3/2005 | Slotto et al. | 347/85 |
| 6,905,201 | B2 | 6/2005 | Leighton | |
| 6,994,430 | B2 | 2/2006 | Silverbrook | |
| 7,011,399 | B2 | 3/2006 | Godil et al. | |
| 7,025,126 | B1 | 4/2006 | Wyatt et al. | |
| 7,066,730 | B2 | 6/2006 | Macaluso | |
| 7,568,795 | B2 | 8/2009 | Freitag et al. | |
| 7,753,512 | B2 | 7/2010 | Jones et al. | |
| 7,798,624 | B2 | 9/2010 | Fairchild et al. | |
| 2003/0038865 | A1 | 2/2003 | Inamura | |
| 2003/0063138 | A1 | 4/2003 | Varnon et al. | |
| 2003/0122904 | A1 | 7/2003 | Matsumoto | |
| 2004/0141023 | A1 | 7/2004 | Nakamura | |
| 2005/0012792 | A1 | 1/2005 | Kumagai et al. | |
| 2005/0046681 | A1 | 3/2005 | Kumagai et al. | |
| 2005/0146584 | A1 | 7/2005 | Godil et al. | |
| 2006/0209146 | A1 | 9/2006 | Reeves | |
| 2008/0055377 | A1 | 3/2008 | Jones et al. | |
| 2009/0273658 | A1 | 11/2009 | Freitag et al. | |

FOREIGN PATENT DOCUMENTS

| | | | |
|---|---|---|---|
| EP | 0933217 | A2 | 8/1999 |
| EP | 1543980 | A1 | 6/2005 |
| WO | 8808514 | A1 | 11/1988 |

OTHER PUBLICATIONS

EP Search Report, European Patent Office, Munich, Germany, Feb. 4, 2009.

Non-Final Office Action for U.S. Appl. No. 11/642,801, Mailed Oct. 30, 2009, United States Patent and Trademark Office (10 pages).

Amendment in Response to Non-Final Office Action for U.S. Appl. No. 11/642,801, submitted Jan. 28, 2010 (12 pages).

Martin, Laura E.; Non-Final Office Action for U.S. Appl. No. 12/498,165; Mailed Aug. 18, 2010 (11 pages).

Lockman, David M.; Amendment in Response to Non-Final Office Action for U.S. Appl. No. 12/498,165; Submitted Oct. 22, 2010 (13 pages).

Martin, Laura E.; Final Office Action for U.S. Appl. No. 12/498,165; Mailed Jan. 4, 2011 (12 pages).

Lockman, David M.; Amendment After Final for U.S. Appl. No. 12/498,165; Submitted Mar. 3, 2011 (8 pages).

European Patent Office; Search Rerport for Application No. 07123815.8; Mailed Apr. 24, 2008 (4 pages).

Lockman, David M., Amendment in response to Office Action for U.S. Appl. No. 13/098,871, submitted Feb. 9, 2012 (10 pages).

Martin, Laura E., Non-final Office Action for U.S. Appl. No. 11/644,617, mailed Apr. 2, 2009 (11 pages).

Lockman, David M., Amendment in response to Non-Final Office Action for U.S. Appl. No. 11/644,617, transmitted Apr. 17, 2009 (12 pages).

Shah, Manish S., Non-final Office Action for U.S. Appl. No. 12/834,654, mailed Nov. 9, 2011 (9 pages).

Lockman, David M., Response to Non-final Office Action for for U.S. Appl. No. 12/834,654, transmitted Jan. 23, 2012 (8 pages).

Martin, Laura E., Non-final Office Action for U.S. Appl. No. 13/098,871, mailed Nov. 9, 2011 (8 pages).

* cited by examiner

SYSTEM AND METHOD FOR TRANSPORTING FLUID THROUGH A CONDUIT

TECHNICAL FIELD

This disclosure relates generally to machines that pump fluid from a supply source to a receptacle, and more particularly, to machines that repetitively deform a conduit to move the fluid.

BACKGROUND

Fluid transport systems are well known and used in a number of applications. For example, ink may be transported from a supply to one or more print heads in a printer and medicines may be delivered from a liquid source to a port for ejection into a patient, to name only two known applications. One method of moving fluids in these known systems is a peristaltic pump. A peristaltic pump typically includes a pair of rotors through which a delivery conduit is stationed. The rotation of the rotors under the driving force of a motor squeezes the delivery conduit in a delivery direction. As an amount of the fluid is pushed in the delivery direction, the supply continues to fill the delivery conduit so fluid is continuously pumped through the delivery conduit to the ejection port.

One issue that arises from the use of peristaltic pumps is the repetitive squeezing of the conduit. As the rotors rotate, they typically force the walls of the conduit closely together before allowing them to rebound. As the number of times that a short length of the conduit is collapsed and expanded increases, the life of the conduit is adversely impacted. One way of addressing this risk of a shortened life cycle for the conduit is to use materials for the conduit that are more resilient than those commonly used for fluid conduits, such as silicone elastomers. Unfortunately, the more resilient materials are expensive and in some applications cost competition is intense.

Other methods used in systems for delivering fluid through a conduit include the provision of a reservoir with a bladder located in the reservoir. The bladder is coupled between an inlet valve and an outlet valve. The bladder is cyclically filled with a gas to pump fluid out of the reservoir and then vented before commencement of the next cycle. Another method injects a compressed gas into an enclosed reservoir to urge fluid from the reservoir. The pressure in the enclosed reservoir is continually increased until the fluid supply in the reservoir is essentially exhausted. In response to a low level in the reservoir being sensed, the gas injection is terminated and the pressure in the reservoir is vented so the reservoir may be replenished or replaced. After replenishment or replacement, compressed gas is again introduced into the reservoir to move fluid into and through a conduit. The pumps used in these various methods to pressurize a reservoir or internal reservoir chamber, however, are generally expensive or bulky for some applications.

Solid ink or phase change ink printers, as noted above, also transport liquid ink from a reservoir to a print head. These printers conventionally use ink in a solid form, either as pellets or as ink sticks of colored cyan, yellow, magenta and black ink, that are inserted into feed channels through openings to the channels. Each of the openings may be constructed to accept sticks of only one particular configuration. Constructing the feed channel openings in this manner helps reduce the risk of an ink stick having a particular characteristic being inserted into the wrong channel. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

After the ink sticks are fed into their corresponding feed channels, they are urged by gravity or a mechanical actuator to a heater assembly of the printer. The heater assembly includes a heater that converts electrical energy into heat and a melt plate. The melt plate is typically formed from aluminum or other lightweight material in the shape of a plate or an open sided funnel. The heater is proximate to the melt plate to heat the melt plate to a temperature that melts an ink stick coming into contact with the melt plate. The melt plate may be tilted with respect to the solid ink channel so that as the solid ink impinging on the melt plate changes phase, it is directed to drip into the reservoir for that color. The ink stored in the reservoir continues to be heated while awaiting subsequent use.

Each reservoir of colored, liquid ink may be coupled to a print head through at least one manifold pathway. The liquid ink is pulled from the reservoir as the print head demands ink for jetting onto a receiving medium or image drum. The print head elements, which are typically piezoelectric devices, receive the liquid ink and expel the ink onto an imaging surface as a controller selectively activates the elements with a driving voltage. Specifically, the liquid ink flows from the reservoirs through manifolds to be ejected from microscopic orifices by piezoelectric elements in the print head.

As throughput rates for liquid ink print heads increase, so does the need for delivering adequate amounts of liquid ink to the print head. One problem arising from higher throughput rates is increased sensitivity to resistance and pressures in the print head flow path. Restricted ink flow can limit or decrease imaging speed. In systems having filtration systems for filtering the liquid ink between the reservoir and a print head element, the flow may also change over time and become insufficient to draw liquid ink to the print head in sufficient amounts to provide the desired print quality.

One way of addressing the issue of flow resistance is to increase the filter area. The increased filter area decreases the pressure drop required to migrate a volume of ink through the filter. Increasing the filter area, however, also increases the cost of the printer as filtration material is often expensive. Moreover, the space for a larger filter may not be available as space in the vicinity of a print head of in a phase change printer is not always readily available.

Another way of overcoming flow resistance as well as increased volume demand with fast imaging is to pressurize the liquid ink to force the ink through a restrictive flow path. One known method of pressurizing a fluid in a conduit is to use a peristaltic pump. As noted above, peristaltic pumps may adversely impact the life of the conduit. Consumers of solid ink printers are sensitive to price and the use of peristaltic pumps with more expensive conduit material may negatively impact pricing of the printers.

The other methods for pressurizing fluid in a conduit noted above also pose tradeoffs in solid ink printer manufacture. For example, inclusion of the reservoir and reservoir arrangement noted above may require extensive modification of some existing printer designs to accommodate the pump operating parameters. If the arrangement of existing components is too extensive, then other limitations may arise, such as space constraints.

SUMMARY

A fluid transporting apparatus described below facilitates flow of fluid from a fluid supply to a receptacle for the fluid.

A fluid transport apparatus facilitates flow of fluid from a source to a receptacle. The fluid transport apparatus includes a fluid transport conduit for transport of fluid through the conduit, the conduit being coupled between a fluid supply and a fluid receptacle, a compressor conduit proximate the fluid transport conduit along a portion of the fluid transport conduit between the fluid supply and the fluid receptacle, and a pump coupled to the compressor conduit for injecting fluid into the compressor conduit, and a vent that is operated to selectively enable pressurization and venting of the compressor conduit to compress and decompress the portion of the fluid transport conduit proximate the compressor conduit to pump fluid through the fluid transport conduit.

A fluid transporting apparatus of this type may be incorporated in a phase change ink imaging device, such as a printer, multi-function product, packaging marker, or other imaging device or subsystem, to facilitate flow of melted ink to a print head reservoir. These imaging devices are referred to as printers below for convenience. An improved phase change ink imaging device includes a melting element for melting solid ink sticks to produce melted ink, a melted ink collector for collecting melted ink produced by the melting element, a melted ink transport apparatus for transporting melted ink from the melted ink collector, a melted ink reservoir for storing melted ink received from the melted ink transport apparatus, a print head for receiving melted ink from the melted ink reservoir; and an imaging surface onto which the print head ejects melted ink to form an image, the melted ink transport apparatus further comprising a double conduit having an ink transport conduit and a compressor conduit, an outlet end of the ink transport conduit of the double conduit being coupled to the melted ink reservoir and an inlet end of the ink transport conduit of the double conduit being coupled to the melted ink collector, a fluid pump that is coupled to an inlet of the compressor conduit to inject fluid into the compressor conduit of the double conduit; and a venting valve coupled to the compressor conduit of the double conduit for selectively relieving pressure in the compressor conduit, the pressurization and venting of the compressor conduit compressing and decompressing the ink transport conduit.

An improved method for pumping fluid includes venting a compressor conduit to relieve pressure exerted against a fluid transporting conduit to draw fluid from a fluid supply into the fluid transporting conduit as the fluid transporting conduit rebounds in response to the relieved pressure, and injecting fluid into the compressor conduit to increase pressure within the compressor conduit for the purpose of expelling a portion of the fluid in the fluid transporting conduit.

BRIEF DESCRIPTION OF THE DRAWINGS

The foregoing aspects and other features of an fluid transport apparatus and an ink imaging device incorporating a fluid transport apparatus are explained in the following description, taken in connection with the accompanying drawings, wherein.

DETAILED DESCRIPTION

Figure 1:
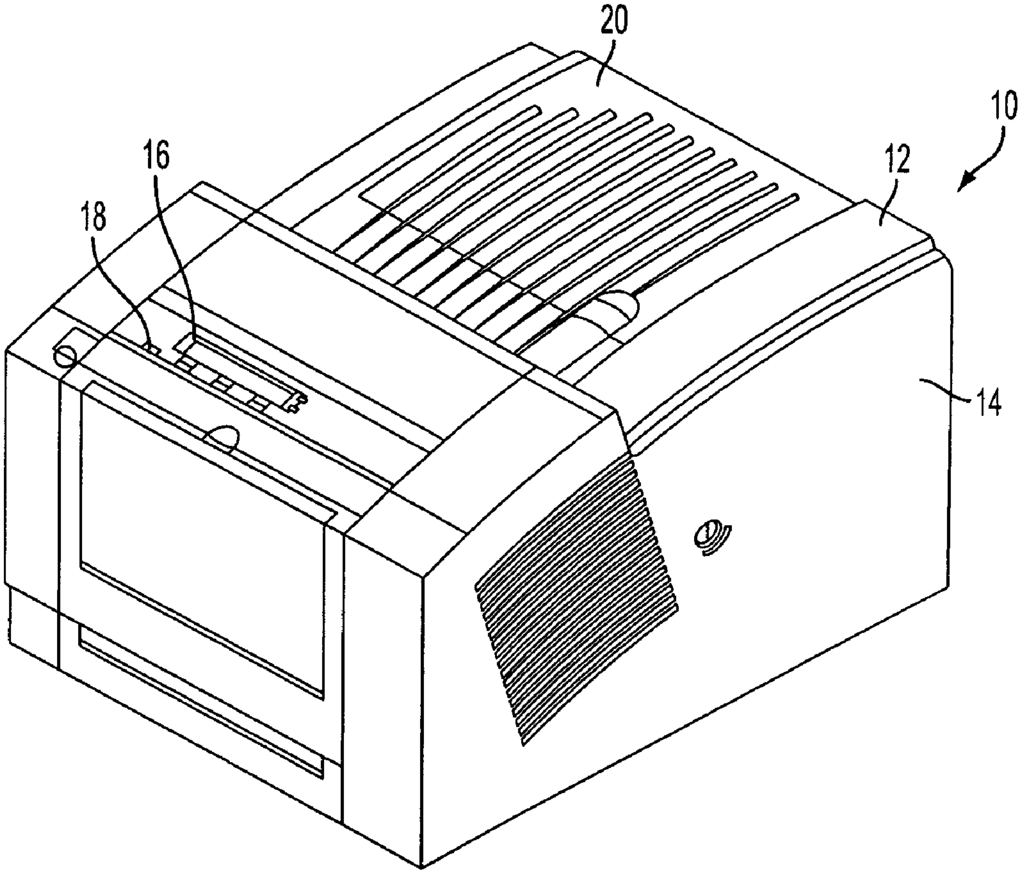
FIG. 1 is a perspective view of a phase change imaging device having a fluid transport apparatus described herein.

Referring to FIG. 1, there is shown a perspective view of an ink printer 10 that incorporates a fluid transporting apparatus, described in more detail below, which delivers melted ink to a reservoir with sufficient pressure to overcome the fluid resistance of a filter. The reader should understand that the fluid transporting apparatus is disclosed as being in an embodiment of a solid ink printer, but the fluid transporting apparatus may be configured for use in other fluid transporting applications. Therefore, the fluid transporting apparatus discussed herein may be implemented in many alternate forms and variations. In addition, any suitable size, shape or type of elements or materials may be used.

FIG. 1 shows an ink printer 10 that includes an outer housing having a top surface 12 and side surfaces 14. A user interface display, such as a front panel display screen 16, displays information concerning the status of the printer, and user instructions. Buttons 18 or other control elements for controlling operation of the printer are adjacent the user interface window, or may be at other locations on the printer. An ink jet printing mechanism (FIG. 3) is contained inside the housing. A melted ink transporting apparatus collects melted ink from a melting element and delivers the melted ink to the printing mechanism. The melted ink transporting apparatus is contained under the top surface of the printer housing. The top surface of the housing includes a hinged ink access cover 20 that opens as shown in FIG. 2, to provide the user access to the ink feed system.

Figure 2:
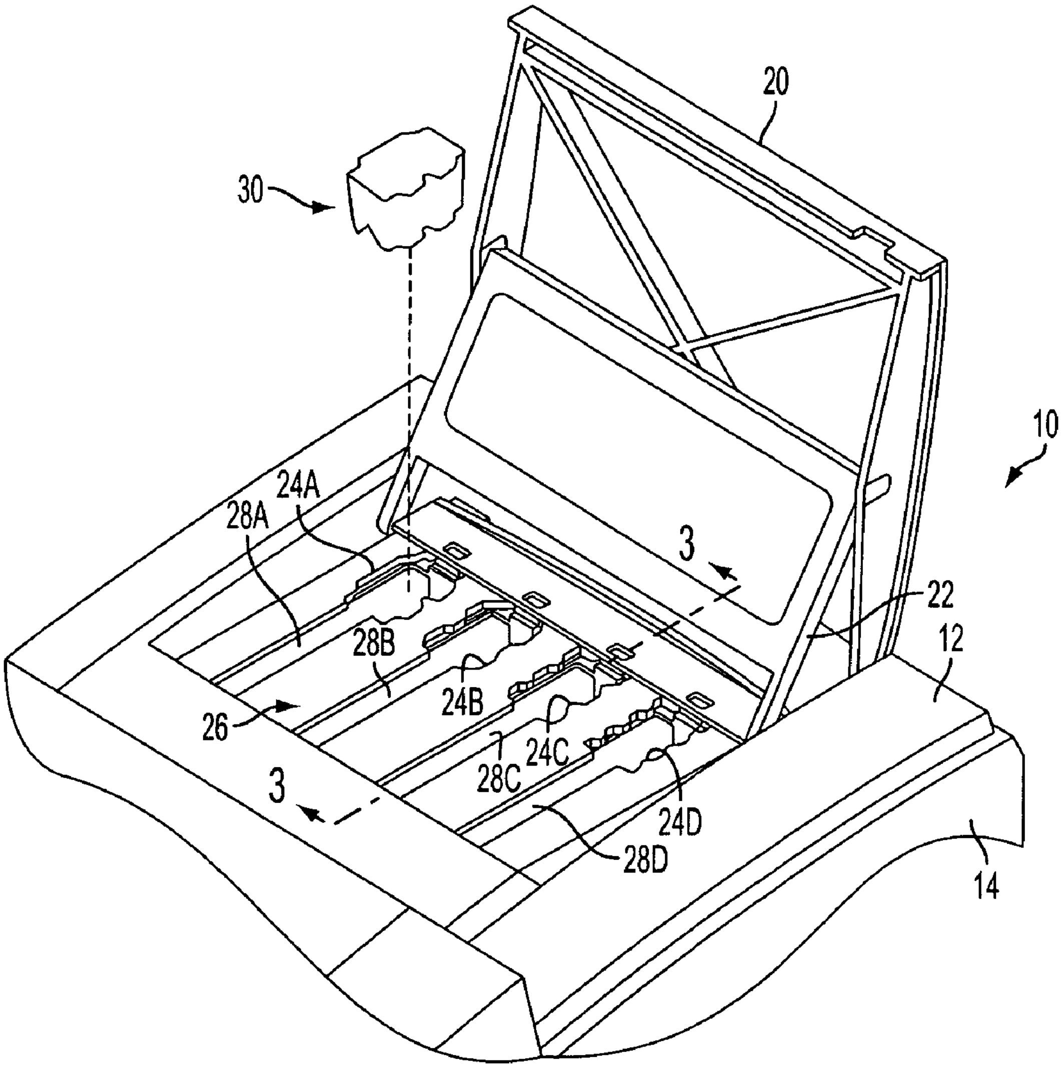
FIG. 2 is an enlarged partial top perspective view of the phase change imaging device with the ink access cover open, showing a solid ink stick in position to be loaded into a feed channel.

In the particular printer shown in FIG. 2, the ink access cover 20 is attached to an ink load linkage element 22 so that when the printer ink access cover 20 is raised, the ink load linkage 22 slides and pivots to an ink load position. The ink access cover and the ink load linkage element may operate as described in U.S. Pat. No. 5,861,903 for an Ink Feed System, issued Jan. 19, 1999 to Crawford et al. As seen in FIG. 2, opening the ink access cover reveals a key plate 26 having keyed openings 24A-D. Each keyed opening 24A, 24B, 24C, 24D provides access to an insertion end of one of several individual feed channels 28A, 28B, 28C, 28D of the solid ink feed system.

A color printer typically uses four colors of ink (yellow, cyan, magenta, and black). Ink sticks 30 of each color are delivered through one of the feed channels 28A-D having the appropriately keyed opening 24A-D that corresponds to the shape of the colored ink stick. The operator of the printer exercises care to avoid inserting ink sticks of one color into a feed channel for a different color. Ink sticks may be so saturated with color dye that it may be difficult for a printer user to tell by color alone which color is which. Cyan, magenta, and black ink sticks in particular can be difficult to distinguish visually based on color appearance. The key plate 26 has keyed openings 24A, 24B, 24C, 24D to aid the printer user in ensuring that only ink sticks of the proper color are inserted into each feed channel. Each keyed opening 24A, 24B, 24C, 24D of the key plate has a unique shape. The ink sticks 30 of the color for that feed channel have a shape corresponding to the shape of the keyed opening. The keyed openings and corresponding ink stick shapes exclude from each ink feed channel ink sticks of all colors except the ink sticks of the proper color for that feed channel.

Figure 3:
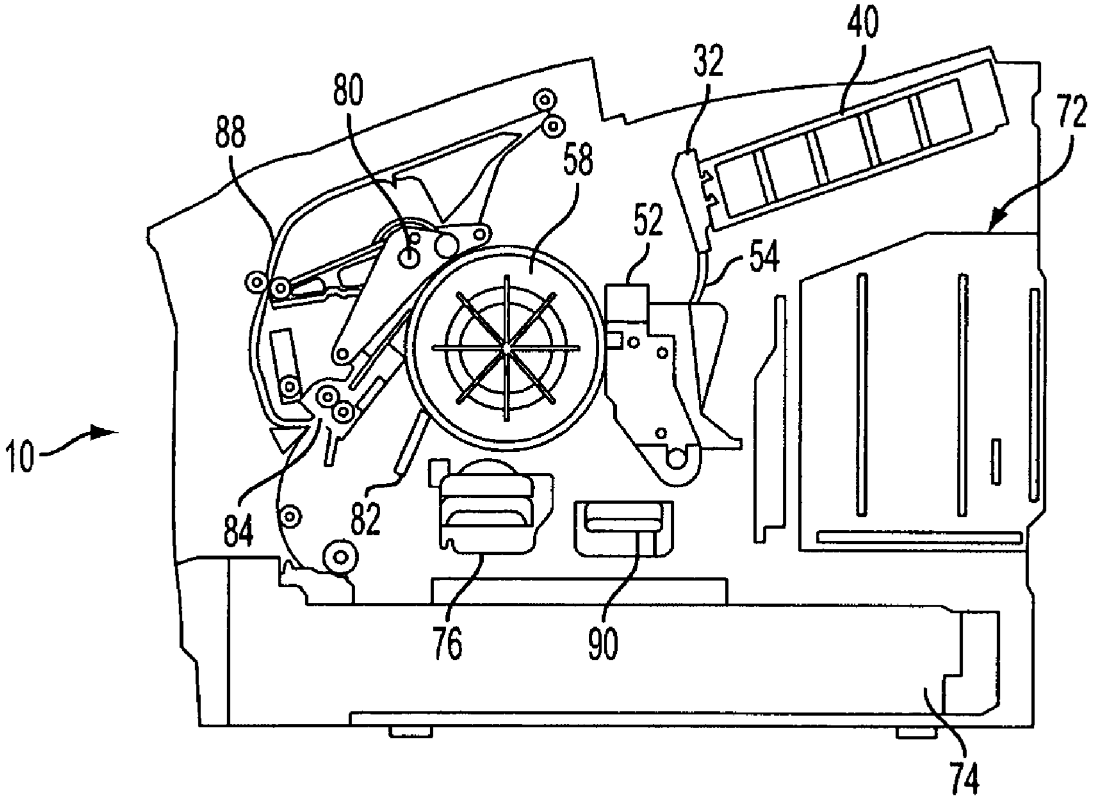
FIG. 3 is a side view of the ink printer shown in FIG. 2 depicting the major subsystems of the ink imaging device.

As shown in FIG. 3, the ink printer 10 may include an ink loading subsystem 70, an electronics module 72, a paper/media tray 74, a print head 52, an intermediate imaging member 58, a drum maintenance subsystem 76, a transfer subsystem 80, a wiper subassembly 82, a paper/media preheater 84, a duplex print path 88, and an ink waste tray 90. In brief, solid ink sticks 30 are loaded into ink loader feed path 40 through which they travel to a solid ink stick melting chamber 32. At the melting chamber, the ink stick is melted and the liquid ink is pumped through a transport conduit 54, in a manner described below, to a reservoir for storage before being delivered to print elements in the print head 52. The ink is ejected by piezoelectric elements through apertures to form an image on the intermediate imaging member 58 as the member rotates. An intermediate imaging member heater is controlled by a controller in the electronics module 72 to maintain the imaging member within an optimal temperature range for generating an ink image and transferring it to a sheet of recording media. A sheet of recording media is removed from the paper/media tray 74 and directed into the paper pre-heater 84 so the sheet of recording media is heated to a more optimal temperature for receiving the ink image. Recording media movement between the transfer roller in the transfer subsystem 80 and the intermediate image member 58 is coordinated for the phasing and transfer of the image.

Figure 4:
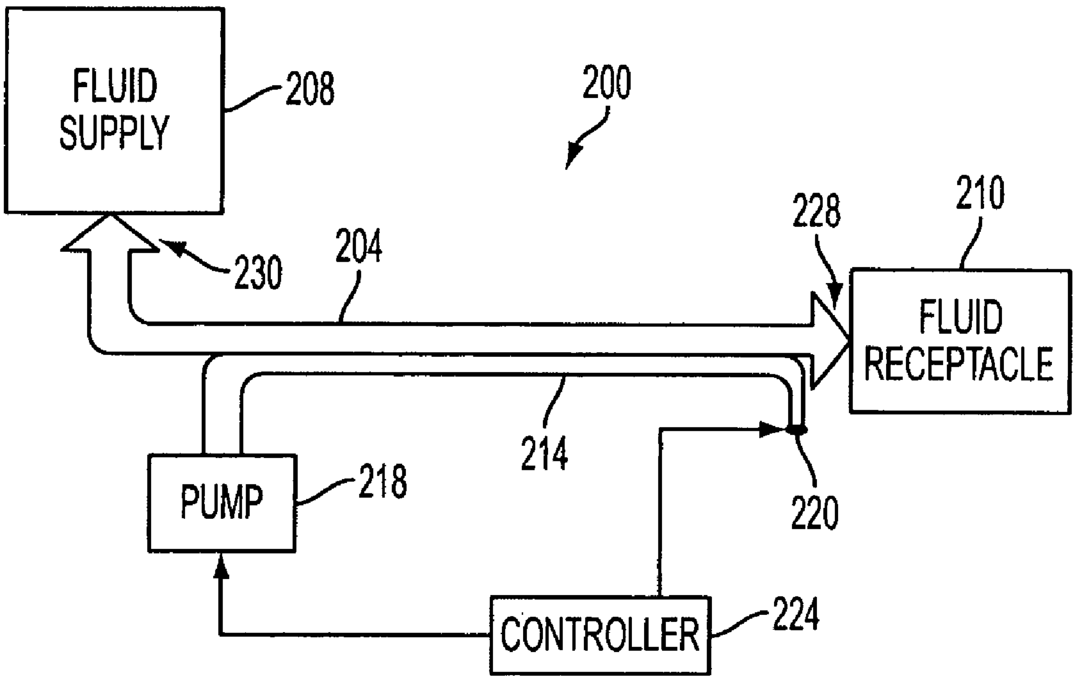
FIG. 4 is a schematic view of a fluid transporting apparatus.

A schematic view of one embodiment of a fluid transporting apparatus 200 is shown in FIG. 4. The apparatus includes a fluid transporting conduit 204 having its inlet coupled to a fluid supply 208 and its outlet coupled to a fluid receptacle 210. A compressor conduit 214 has its inlet coupled to the outlet of a pump 218 and its outlet coupled to a vent 220. Compressor conduit 214 is proximate to a portion of the conduit 204. The vent 220 and the pump 218 are electrically coupled to a controller 224 for selectively activating and deactivating these components. The pump 218 may be a fixed or variable displacement pump that is driven by a motor (not shown). The motor may be external to or incorporated within a housing for the pump 218.

The apparatus 200 implements a method for pumping fluid from the fluid supply 208 to the fluid receptacle 210 that does not require complete collapse of the fluid transporting conduit 204. The method includes fluid from the fluid supply 208 being drawn into the fluid transporting conduit 204 in one phase of the pumping cycle and fluid is ejected from the outlet of the conduit 204 into the receptacle 210 during another phase of the cycle. After activation by the controller 224, the pump 218 injects a fluid into compressor conduit 214. Because the controller 224 has operated the vent 220 to be closed, the injection of fluid into the conduit 214 expands the walls of the conduit 214. This expansion compresses the wall of the conduit 204 along the portion that is proximate the conduit 214. The effectiveness of the transport conduit compression depends upon the geometry of the conduits and materials from which the conduits are made as well as the duration of the cycle phases and pressures used for compression. This compression ejects a portion of the fluid within the conduit into the receptacle 210. The controller 224 operates the vent 220 to open, which relieves the pressure within the compressor conduit 214 and the conduit 204 rebounds to its former shape. As the conduit rebounds, the conduit 204 returns to its nominal shape, which enables fluid from the fluid supply 208 to enter the conduit 204 for the next cycle of pressurizing and venting the conduit 214 to pump fluid through the fluid transporting conduit 204. A check valve 228 may be provided at the outlet of the fluid transporting conduit 204 to block fluid from the fluid receptacle from re-entering the conduit 204. Likewise, a check valve 230 may be coupled to the inlet of the fluid transporting conduit 204 to block fluid within the conduit 204 from re-entering the fluid supply 208.

The fluid transport apparatus may incorporate a variety of structures for relieving pressure in the compressor conduit. These structures may include a vent port, as described above, for opening the conduit to a lower pressure area so a pressure drop occurs within the compressor conduit. In a closed system, such as a piston within a cylinder that is coupled to the compressor conduit, the return stroke of the piston withdraws the compression fluid into the cylinder so the transport conduit is able to rebound. Other structures for relieving pressure may be used to reduce pressure within the compressor conduit so the fluid transport conduit may rebound and draw fluid into the fluid transport conduit. All such structures are encompassed within the term “vent” as used herein.

Because the compression and decompression of the fluid transporting conduit 204 in the apparatus 200 occurs along a portion of the fluid transporting conduit that is longer than a typical section of conduit pinched by a typical peristaltic pump, the flexing of the conduit wall need not be as extensive as required with a peristaltic pump. The reduction in conduit wall compression and decompression helps extend the life of the conduit. In one embodiment of the apparatus 200, the pump is an air compressor. Such a pressure source is relatively inexpensive.

Figure 5:
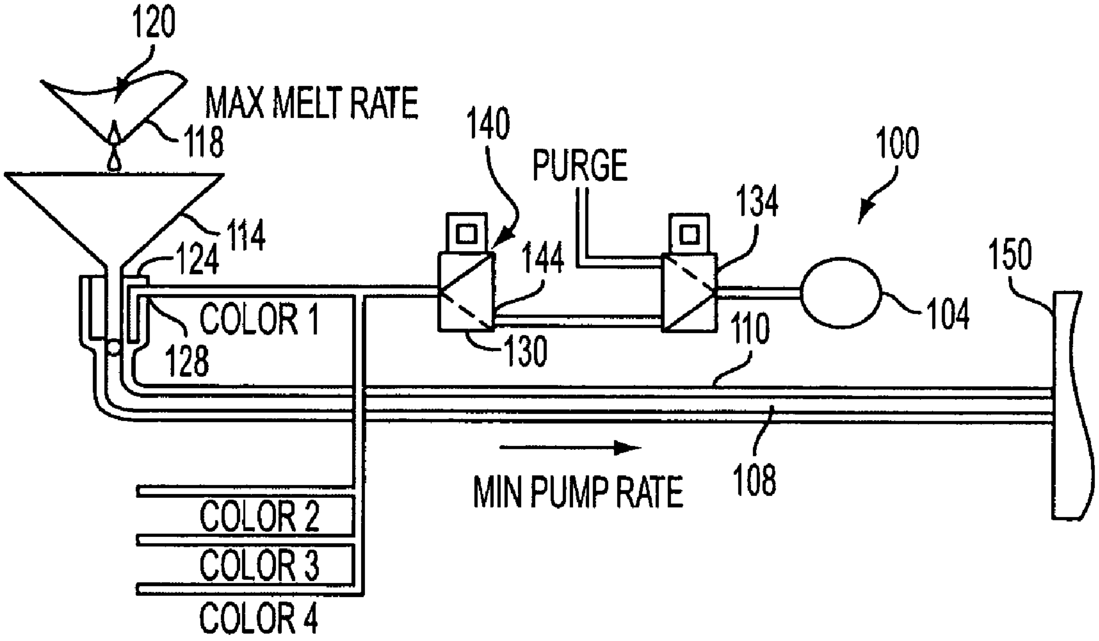
FIG. 5 is a schematic view of a melted ink transporting apparatus.

A schematic view of one embodiment of a fluid transporting apparatus 100 that may be used for melted ink is shown in FIG. 5. The apparatus 100 is similar to the fluid transporting apparatus 200 and includes a pump 104, a melted ink transporting conduit 108, and a compressor conduit 110. An inlet of the ink transporting conduit 108 is coupled to a collector 114 for catching ink as solid ink sticks are liquefied by a melting element 120. The melting element 120 may be a conventional melt plate with a single drip point or it may have another configuration, such as a melting trough, a plate with multiple drip points, or a melting chamber like those disclosed in co-pending U.S. patent application Ser. No. 11/411,678 entitled “System And Method For Melting Solid Ink Sticks In A Phase Change Ink Printer,” which was filed on Apr. 26, 2006. The collector 114 may be a funnel or other tapered structure for collecting ink drops and directing them to the open end of the conduit 108. The collector 114 may be a connector for coupling the open end of the conduit 108 to the outlet of the melting chamber.

A connector 124 couples the compressor conduit 110 with a port 128. The port 128 enables the downstream side of valve 130 to be coupled to the compressor conduit 110. The upstream side of valve 130 is coupled to the downstream side of the valve 134. The upstream side of valve 134 is coupled to the pump 104. Pump 104 injects a fluid into the compressor conduit 110 through the valves 130 and 134. The pump 104 may displace air or another gas into the compressor conduit 110 to pressurize the conduit, although liquids may also be used for this purpose. The fluid displaced by the pump 104 flows through valve 134 to valve 130. To leverage the cost of the pump, valve 134 may be used to couple the pump 104 to the transport conduit system or another component, such as a print head for a purge function in the illustrative example. Such a valve, however, is not required for operation of the transport conduit system. Valve 130 couples the fluid injected by the pump 104 to a plurality of connectors 124, one for each color of ink used in the printer 10. Although FIG. 5 depicts the use of a single pump 104 for transporting all ink colors, each color may have its own pump, although the cost of multiple pumps may not justify an independently controlled pump for each color. Valves 130 and 134 may be electrically actuated and coupled to the controller in the electronics module 72 for sequence control of the valves. Additionally, the pump 104 may be coupled to the controller for actuation and speed control of the pump 104. The fluid injected by the pump 104 into the compressor conduit 110 pressurizes the conduit 110 to squeeze the ink transport conduit 108 for expulsion of melted ink from the conduit 110 in a manner described in more detail below. During the pressure relief phase of the cycle, pressure is relieved by operating valve 130 so the conduit 110 is coupled to the vent port 140 of the valve 130 and the pressure is relieved. In the illustrative example, the pressure is released to ambient air. In the next phase of the cycle, valve 130 is operated to couple the conduit 110 to the pump 104 through port 144 so that the conduit 110 is pressurized again. Vent port 140 may also be coupled to a negative pressure source during the pressure relief phase of the cycle to more quickly relieve pressure within the compressor conduit 110.

Figure 6:
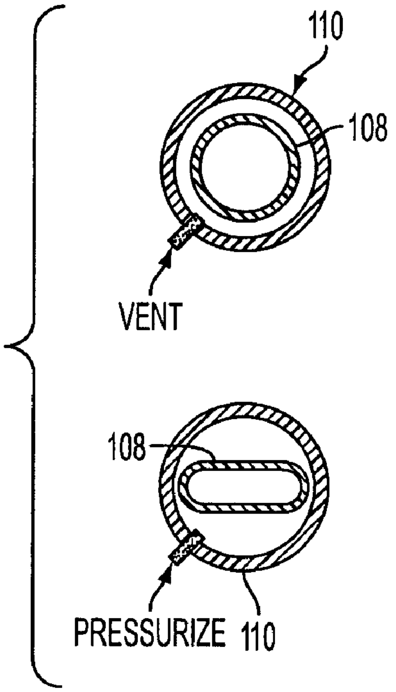
FIG. 6 is an exemplary embodiment of a double conduit that may be used in the apparatus of FIG. 5.

One embodiment of the conduits for transporting fluid is shown in FIG. 6. The fluid transport conduit 108 is shown as being located within the compressor conduit 110. The relationship of the two conduits in this embodiment during the venting of the compressor conduit 110 is shown in the upper configuration of FIG. 6. When the conduit 110 is vented as described above, for example, with reference to valve 130, the fluid transport conduit 108 rebounds to its relaxed position. As the conduit 108 rebounds, it tends to pull fluid into its inlet to the extent that the fluid is available to flow from the collector 114. When the conduit 110 is pressurized as described above, for example, with reference to fluid being injected into the compressor conduit 110, fluid transport conduit 108 is squeezed as shown in the lower configuration of FIG. 6. This action on the conduit 108 expels fluid from the outlet of the transport conduit 108 that may be coupled, for example, to a reservoir 150, as shown in FIG. 5. In response to the subsequent venting of the compressor conduit 110, the transport conduit 108 again relaxes. Because the volume of fluid within the conduit 108 has been reduced by the amount of fluid expelled during the pressurization of the compressor conduit 110, the transport conduit 108 is able to accept a corresponding amount of fluid at its inlet, which is coupled, in the illustrative example of FIG. 5, to the collector 114.

With reference to the illustrative example shown in FIG. 5, the one way movement of fluid within the fluid transport conduit 108 may be enhanced by incorporating check valves 154 and 158 at each end of the conduit 108. Check valve 154 prevents fluid expelled from the conduit 108 into a reservoir, for example, from returning to the conduit 108. Check valve 158 prevents fluid from escaping from the conduit 108 at the inlet coupled to the collector 114. Thus, check valve 158 helps maintain pressure within the conduit 108 for the expulsion of ink into the print head reservoir 150. Check valves may be used at the inlet, outlet, or both the inlet and outlet of the transport conduit to ensure movement of the fluid through the fluid conduit. A number of factors influence the need for including check valves, including geometry of the conduits, orientation of the system relative to gravity, viscosity of the fluid, timing of the cycle phases, and other related parameters.

Figure 7:
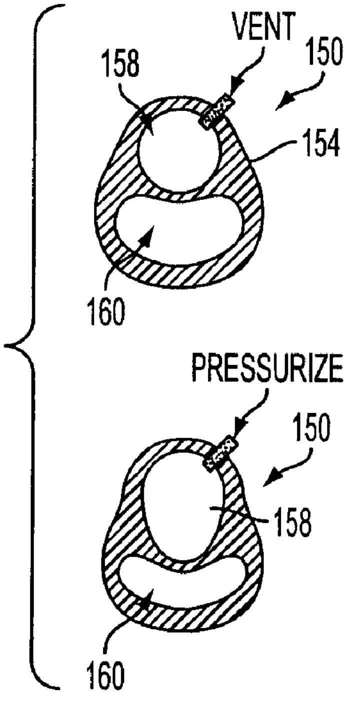
FIG. 7 is an exemplary embodiment of another double conduit that may be used in the apparatus of FIG. 5.

Another embodiment of a conduit for transporting ink in a phase change ink printer is shown in FIG. 7. This conduit 150 is comprised of a double conduit. The double conduit has a unitary wall 154 that separates the compressor conduit 158 from the ink transport conduit 160 and both of the conduits from the ambient environment. The compressor conduit 158 is generally parallel to the transport conduit 160. In this embodiment, compressing and releasing the compressor conduit 158 in a manner such as the one described above, squeezes the transport conduit 160 as shown in the bottom configuration of FIG. 7. This squeezing expels ink from the transport conduit 160. When the compressor conduit 160 is vented, in a manner such as described above, the transport conduit 160 rebounds to accept melted ink from the collector 114. Also, as noted above, a check valve may be placed at one or both ends of the transport conduit 160 to preserve one way flow of ink through the conduit.

Figure 8:
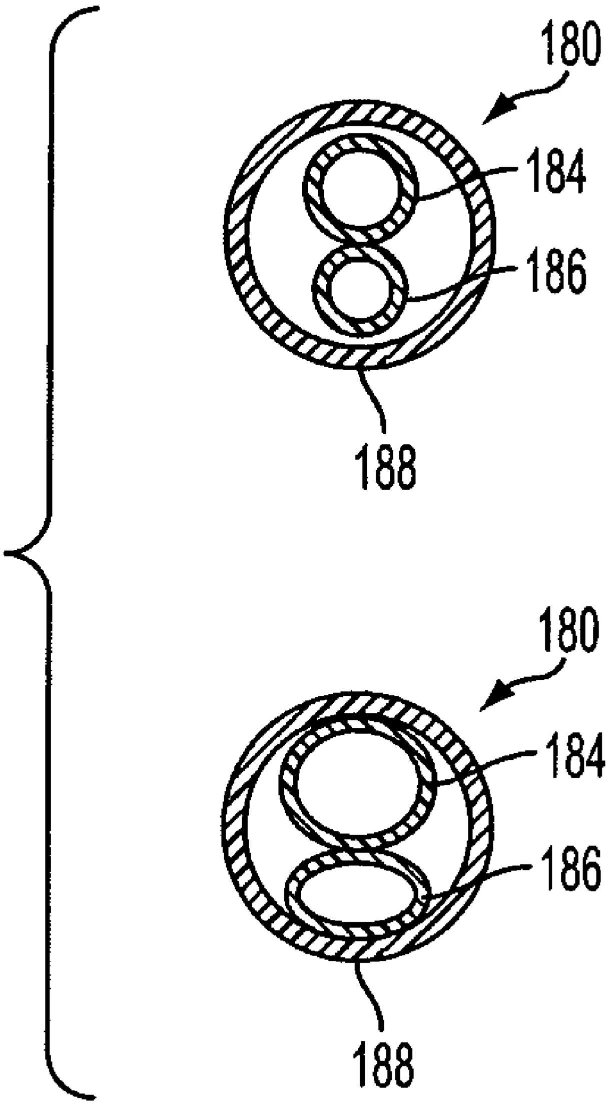
FIG. 8 is an exemplary embodiment of another double conduit that may be used in the apparatus of FIG. 5.

Another embodiment of a conduit for transporting ink in a phase change ink printer is shown in FIG. 8. In this embodiment, the conduit 180 includes a compressor conduit 184 and a fluid transport conduit 186 within a housing conduit 188. The housing conduit 188 may be flexible or rigid. The interior volume of conduit 188 is sufficiently large to accommodate both the compressor conduit 184 and the fluid transport conduit 186. The compressor conduit 158 is generally parallel to the transport conduit 160 within the housing conduit 188. Compressing and releasing the compressor conduit 184 in a manner such as the one described above, squeezes the fluid transport conduit 186 as shown in the bottom configuration of FIG. 8. The housing conduit 188 is sufficiently rigid to hold the fluid transport conduit 186 in engagement with the compressor conduit 184 to enhance the compression of the fluid conduit and expel fluid from the transport conduit 186. When the compressor conduit 184 is vented, in a manner such as described above, the transport conduit 186 rebounds to accept fluid from a fluid source. Also, as noted above, a check valve may be placed or incorporated at one or both ends of the transport conduit 186 to preserve one way flow of ink through the conduit. The conduit 150, described above with reference to FIG. 7, may also be placed within a housing conduit 188 and operated in a similar manner.

The compressor conduit 110 and the ink transport conduit 108 may be incorporated into a single, parallel conduit arrangement, as shown, for example, in FIG. 7, or they may be individual conduits. If they are individual conduits, they may be mounted one within the other one as shown, for example, in FIG. 6, or they may be placed adjacent to one another and surrounded by a third continuing tube. The conduit within a conduit arrangement shown in FIG. 6 does not require that the conduits be concentrically arranged for effective operation. The compressor conduit and the ink transport conduit may both be formed from elastomeric materials, such as a silicone or urethane, for example. In the conduit within a conduit configuration, such as shown in FIG. 6, the compressor conduit may be constructed from rigid material, such as stainless steel or brass. The conduits may be formed with internal or external springs to prevent kinking. Additionally, one or both of the conduits may be formed with a heating element, such as nichrome wire, or a cooling element to maintain the fluid within the fluid transport conduit at a desired temperature that differs from the ambient temperature.

Full compressed displacement of the fluid transport conduit is not required for efficient pumping of the fluid into a reservoir or other receptacle. Because the full length of the tube tends to compress to a nearly equal degree only a small amount of compression is needed to displace a sizable volume of fluid from the fluid transport conduit. For example, thirty percent displacement of the transport conduit wall may be sufficient to provide an adequate flow of fluid during an expulsion phase of the pumping cycle. By reducing the compression of the transport conduit to less than 100% displacement, the life cycle of the conduit is improved over conduits compressed by peristaltic pumps or the like.

Although the conduits may be formed in cylindrical shapes, other shapes, such as flat shapes, for example, are possible. Shape may not be a critical parameter because as the transport conduit changes shape, it is generally compressed in one axis while expanding in another axis. For this reason, the compressor conduit must be sized and/or shaped to accommodate the expansion of the transport conduit or be flexible enough to conform to the expanded transport conduit. Likewise, the transport conduit may be shaped to assume the shape of a crescent, a twist, or other shape in response to the pressure within the compressor conduit. Additionally, the conduits may have a weakened wall portion that operates as a check valve. For example, forming the transport conduit with a thinner wall near the ink inlet enables that portion of the transport conduit to collapse further and more quickly than the remaining portion of the conduit. This action may seal the inlet of the conduit sufficiently to eliminate the need for a separate check valve. Weakened wall sections that operate as check valves may also be produced by flattening the fluid transport conduit in a particular region, or forming a portion of the fluid conduit with a more flexible or reduced durometer material in a particular region.

In one embodiment of a fluid transporting apparatus, 170 mm lengths of silicone tubing were used for a compressor conduit and a fluid transport conduit. The fluid transport conduit had an inner diameter of 3.5 mm and a wall thickness of 0.4 mm. The compressor conduit had an inner diameter of 5.3 mm and a 0.6 mm thick wall. The pump and valves were operated to perform a pressure and venting cycle in 0.6 seconds. The average pump rate was 14.6 ml/minute and the compressed air pressure was approximately 5 PSI. Control of pump pressure, as well as cycle "on" and "off" times, were found effective for varying the flow rates through the transport apparatus.

Various embodiments of the fluid transport apparatus may be used to implement a method for transporting fluid. The method includes relieving pressure in a compressor conduit to enable a fluid transporting conduit to draw fluid from a fluid supply as the fluid transporting conduit rebounds in response to the relieved pressure, and injecting fluid into the compressor conduit to increase pressure within the compressor conduit for the purpose of expelling a portion of the fluid in the fluid transporting conduit. Relieving pressure in the compressor conduit may be achieved through a variety of techniques. These techniques may include opening the conduit to a lower pressure area so a pressure drop occurs within the compressor conduit. In a closed system, such as a piston within a cylinder that is coupled to the compressor conduit, one stroke of the piston increases pressure within the compressor conduit and the return stroke withdraws the compression fluid into the cylinder to vent the compressor conduit so the transport conduit is able to rebound. Other techniques for relieving pressure may be used to reduce pressure within the compressor conduit so the fluid transport conduit may rebound and draw fluid into the fluid transport conduit. All such techniques are encompassed within the term "venting" as used herein.

In a device requiring transformation of a solid to a liquid, such as the phase change ink imaging device described above, the method may also include the melting of a solid to produce a liquid and the collection of the liquid for insertion into the fluid transporting conduit. The method may also include temperature regulation of the conduits to maintain the liquids within the conduits at a desired temperature. The method may also include preventing backflow of the expelled fluid into the fluid transporting conduit and preventing backflow of the fluid into the fluid reservoir or other receptacle to maintain pressure for expelling the fluid from the fluid transporting conduit. Additionally, the method may include coupling of the compressor conduit to a negative pressure source to assist in reducing pressure in the compressor conduit.

Those skilled in the art will recognize that numerous modifications can be made to the specific implementations of the melting chamber described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A phase change ink imaging device comprising:

a melting element for melting solid ink sticks to produce melted ink;

a melted ink collector for collecting melted ink produced by the melting element;

a melted ink transport apparatus for transporting melted ink from the melted ink collector;

a melted ink reservoir for storing melted ink received from the melted ink transport apparatus;

a print head for receiving melted ink from the melted ink reservoir; and the melted ink transport apparatus further comprising:

a double conduit having an ink transport conduit and a compressor conduit, the ink transport conduit being located within the compressor conduit of the double conduit, an outlet end of the ink transport conduit of the double conduit being coupled to the melted ink reservoir and an inlet end of the ink transport conduit of the double conduit being connected to the melted ink collector;

a fluid pump that is fluidly coupled to an inlet of the compressor conduit;

a venting valve fluidly coupled to the compressor conduit of the double conduit; and a controller operatively connected to the fluid pump and the venting valve, the controller being configured to operate the fluid pump and the venting value to enable pressurizing of the compressor conduit to a pressure that deforms the ink transport conduit and venting of the deforming pressure from the compressor conduit to enable the ink transport conduit to return to a non-deformed shape and thereby pump melted ink through the ink transport conduit.

2. The phase change ink imaging device of claim 1 wherein the ink transport conduit is parallel to the compressor conduit.

3. The phase change ink imaging device of claim 1 further comprising:

a common unitary wall between the ink transport conduit and the compressor conduit.

4. The phase change ink imaging device of claim 1 further comprising:

a housing conduit within which the ink transport conduit and the compressor conduit are located.

5. The phase change ink imaging device of claim 1 further comprising:

a check valve coupled to the ink transport conduit to prevent backflow of the melted ink into the ink transport conduit.

6. The phase change ink imaging device of claim 1 further comprising:
a check valve coupled between the melted ink collector and the inlet of the ink transport conduit to enable a flow pressure in the ink transport conduit.

7. The phase change ink imaging device of claim 1 wherein the pump is an air pump and the fluid injected into the compressor conduit is air.

8. The phase change ink imaging device of claim 1 further comprising:
a negative pressure source coupled to the compressor conduit through the venting valve to assist in reducing pressure in the compressor conduit.

9. A method for pumping fluid in a phase change ink imaging device comprising:
melting solid ink sticks to produce melted ink;
collecting the melted ink in a reservoir;
injecting fluid with a fluid pump into an inlet of a compressor conduit of a double conduit to generate a pressure that deforms an ink transport conduit having an inlet that is operatively connected to the reservoir, the ink transport conduit being positioned within the compressor conduit;
selectively operating a venting valve to enable pressurizing of the compressor conduit to a pressure that deforms the ink transport conduit and venting of the pressure in the compressor conduit to enable the ink transport conduit to return to a non-deformed shape to transport the melted ink received from the reservoir through the ink transport conduit of the double conduit; and
receiving the melted ink at a printhead that is operatively connected to an outlet of the ink transport conduit.

10. The method of claim 9 wherein the pressurizing and venting of the compressor conduit operates on the ink transport conduit that is parallel to the compressor conduit.

11. The method of claim 9, wherein the pressurizing and venting of the compressor conduit operates on a common unitary wall between the ink transport conduit and the compressor conduit.

12. The method of claim 9 further comprising:
preventing backflow of the melted ink into the ink transport conduit with a check valve coupled to the ink transport conduit.

13. The method of claim 9 further comprising:
enabling a flow pressure in the ink transport conduit with a check valve coupled to an inlet of the ink transport conduit.

14. The method of claim 9 wherein the fluid pump is an air pump that injects air into the compressor conduit.

15. The method of claim 9 further comprising:
reducing pressure in the compressor conduit with a negative pressure source coupled to the venting valve.

* * * * *